United States Patent [19]
Wang

[11] Patent Number: 5,157,637
[45] Date of Patent: Oct. 20, 1992

[54] METHOD OF STRUCTURAL TRAVELTIME TOMOGRAPHY

[75] Inventor: Shein S. Wang, Ponca City, Okla.

[73] Assignee: Conoco Inc., Ponca City, Okla.

[21] Appl. No.: 846,319

[22] Filed: Mar. 5, 1992

[51] Int. Cl.⁵ ............................................. G01V 1/36
[52] U.S. Cl. ......................................... 367/38; 367/50
[58] Field of Search ................... 367/38, 50, 51, 52, 367/73; 364/421

[56] References Cited

U.S. PATENT DOCUMENTS

| 4,241,429 | 12/1980 | Bloomquist et al. | 367/52 |
| 4,736,347 | 4/1988 | Goldberg et al. | 367/46 |
| 4,766,574 | 8/1988 | Whitmore, Jr. et al. | 367/50 |
| 4,802,146 | 1/1989 | Moeckel | 367/52 |
| 4,802,147 | 1/1989 | Moeckel | 367/57 |
| 4,813,027 | 3/1989 | Tieman | 367/52 |
| 4,992,996 | 2/1991 | Wang et al. | 367/53 |
| 5,089,994 | 2/1992 | Harlan et al. | 367/73 |

Primary Examiner—Ian J. Lobo

[57] ABSTRACT

The invention relates to a method of structural traveltime tomography which uses mismatched image information observed on common image point gathers to determine the precise location of near vertical boundaries or faults. The method can distinguish an error caused by a misplaced fault from velocity caused errors, then it reduces these errors by correcting the location of the fault. The result is a better depth image from better aligned events, and better correction to the velocities from a follow-up tomography using current velocity tomography.

9 Claims, 3 Drawing Sheets

5,157,637

METHOD OF STRUCTURAL TRAVELTIME TOMOGRAPHY

BACKGROUND OF THE INVENTION

1. Field of the Invention

The present invention pertains to a method of structural traveltime tomography analysis used to distinguish an error caused by a misplaced fault from velocity caused errors and to correct the location of the fault using common image point gathers.

2. Related Prior Art

Currently tomography is used to compute corrections to velocities from observed traveltime errors. The nonflatness of events observed on post-migration parts or common image point gathers, however indicates errors which can be caused by several reasons: error in velocity, error in the location of an earlier reflector, or error in placing a shallow fault. Previous methods have dealt with the first reason. In some cases, however, the velocity will be over corrected by assuming all the observed traveltime errors originated by velocities. In the worst case, the over corrected velocity will force more structural errors in deeper reflectors, and the vicious cycle repeats itself so that a correct velocity model cannot be obtained from further iteration. If the errors caused by misplaced fault locations can be corrected, the result is a better depth image from better aligned events and a better correction to the velocities from a follow-up tomography using the velocity tomography. Examples of seismic data processing methods which include migration and examples of methods for determining the location of subsurface interfaces are as follows.

U.S. Pat. No. 4,241,429 entitled "Velocity Determination and Stacking Process from Seismic Exploration of Three Dimensional Reflection Geometry" (Marvin G. Bloomquist et al) relates to a method for determining the dip and strike of subsurface interfaces and average propagation velocity of seismic waves. In seismic exploration, linear, multiple fold, common depth point sets of seismograms with three dimensional reflection geometry are used to determine the dip and strike of the subsurface reflecting interfaces and the average velocity of the path of the seismic energy to the reflecting interface. The reflections with each set appear with time differences on a hyperbola with trace spacing determined by the source receiver coordinate distance along the lines of exploration. The offset of the apex of this hyperbola is determined from a normal moveout velocity search of the type performed on two dimensional common depth point sets. This search identifies the correct stacking velocity and hyperbola offset which are used to determine dip, strike and average velocity.

U.S. Pat. No. 4,736,347 entitled "Multiple Stacking an Spatial Mapping of Seismic Data" (Bernard Goldberg et al) relates to a method for determining the dip of subsurface formations and the apparent acoustic velocity. Seismic traces are stacked in a plurality of orthogonal measures to form multiple stack traces at a positive offset. This stacking process determines the apparent velocities as functions of the travel time at the positive offset. The interval acoustic velocity of the first layer is then determined from knowledge of surface topography, source-receiver offset, two-way travel times and the first reflector apparent velocities. The first layer velocity information enables the incident and emergent angles of the raypaths at the surface to be calculated, as well as enabling the dip angles and spatial coordinates of the reflection points on the first reflecting boundary to be determined. Seismic data corresponding to the second reflecting boundary are then mapped spatially to the first reflecting boundary by ray tracing and by calculating the apparent velocities at the first boundary. The process is repeated for each succeedingly deeper boundary. The derived acoustic velocity model of the earth is displayed as a stacked seismic section in spatial coordinates.

U.S. Pat. No. 4,813,027 "Method and Apparatus for Enhancing Seismic Data" (Hans Tieman) relates to a method and apparatus for stacking a plurality of seismic midpoint gathers to provide a pictorial representation of seismic events. The approximate propagation velocity, corresponding to a selected event in a common midpoint gather, is determined by summing the common midpoint gather using first and second weights to provide respective first and second weighted sums over an offset based on an estimated velocity corresponding to the event. A velocity error value indicative of the approximate error between the estimated velocity and the actual velocity is developed from the sums. The common midpoint gather is then re-stacked in accordance with the determined propagation velocity to provide an enhanced pictorial representation of the seismic event. The first and second weighted sums are taken over a time window centered upon an estimated zero offset travel time for the event. The first and second weights can be selected to provide rapid, slow or intermediate convergence upon the true velocity. The velocity error value is determined as a function of the derivation of the peak of the first weighted sum from the center of the time window, relative to the derivation of the peak of the second weighted sum from the center of the time window. Alternatively, the velocity error value is determined as a function of the derivation of the peak of the cross-correlation of the first and second weighted sum from the center of the time window.

U.S. Pat. No. 4,766,574 entitled "Method for Depth Imaging Multicomponent Seismic Data" (Norman D. Whitmore, Jr. et al) relates generally to a method of geophysical exploration. This method may be used for imaging multicomponent seismic data to obtain depth images of the earth's subsurface geological structure as well as estimates of compressional and shear wave interval velocities. In particular, measures are obtained of imparted seismic wavefields incident on reflecting interfaces in the earth's subsurface and of resulting seismic wavefields scattered therefrom. The incident and scattered wavefields are employed to produce time-dependent reflectivity functions which are representative of the reflecting interfaces. By migrating the time-dependent reflectivity functions, better depth images of the reflecting interfaces can be obtained.

U.S. Pat. No. 4,802,147 entitled "Method For Segregating And Stacking Vertical Seismic Profile Data In Common Reflection Point Bins" (George P. Moeckel) relates to a method for segregating and stacking vertical seismic profile data. The offset difference between the well location and the position of the source is divided into equal segments. Vertical seismic profile moveout corrected data is placed in common reflection point bins and stacked.

U.S. Pat. No. 4,802,146 titled "Method For Moveout Correction And Stacking Velocity Estimation Of Offset VSP Data" (George P. Moeckel) relates to a moveout correction process and velocity stacking estimation process to permit stacking of vertical seismic profile (VSP) data. The primary reflection time is determined by using the two-way travel time, the root mean square velocity of acoustic pulses in the formation and the first arrival time of direct path acoustic pulses.

U.S. Pat. No. 4,992,996 titled "Interval Velocity Analysis And Depth Migration Using Common Reflection Point Gathers" (Wang et al) relates to a method for performing velocity analysis while eliminating the effects on weak signals caused by strong signals which includes migrating each event of the prestack trace to a signal location instead of all possible locations. The input trace is divided into many windows, and each window is migrated to a place determined by ray tracing the center of the window through the model. If the velocity model is accurate, each event will be migrated to the proper location yielding an accurate depth section with no migration artifacts. As a by product, if the model is not accurate, the post migrated parts, migrated common offset depth sections sorted into common midpoint gathers provide an interpretable velocity analysis.

U.S. Pat. No. 5,089,994 titled "Tomographic Estimation Of Seismic Transmission Velocities From Constant Offset Depth Migrations" (Harlan et al) relates to a method for improving velocity models so that constant offset migrations estimate consistent positions for reflectors which includes tomographic estimation of seismic transmission velocities from constant offset depth migrations. A method of converting inconsistencies in reflector positioning from constant offset migrations into equivalent errors in modeled traveltimes is introduced, so that conventional methods of traveltime tomography can improve the velocity model.

SUMMARY OF THE INVENTION

The present method, by observing broken image events on common image point gathers, can distinguish an error caused by a misplaced near vertical boundary, such as faults, salt flanks, salt overhangs and reefs from velocity caused errors.

In the present invention, common offset gathers are migrated in depth and the results are sorted into common image point (CIP) gathers. The presence of a near vertical boundary is ascertained from the CIP gathers in the initial model by determining the presence of broken image events on the CIP gathers. The depth values of the broken image are selected from the CIP gathers and converted to traveltime values. The fault location on the initial model is varied to form a new model. The fault location is varied by changing the dip of the fault or changing the location of the fault to the right or left or both. The traveltime values are converted to new depth values using the new model. The correct fault location is determined by minimizing the mismatches of the broken-image events in the depth values of the new model. The procedure can be iterative and allow alternating improvements in the positions of the fault locations and fault dip therefore improving the velocity model.

DESCRIPTION OF THE PREFERRED EMBODIMENT

The present method, by observing broken image events on common image point gathers, can distinguish an error caused by a misplaced near vertical boundary, such as faults, salt flanks, salt overhangs and reefs from velocity caused errors. This prevents overcorrection of the velocity which happens when all the observed traveltime errors are assumed to be originated by velocities. The present invention reduces these errors by correcting the location and the dip of the near vertical boundary or fault on the velocity model resulting in a better depth image from better aligned events and better correction to the velocities from a follow-up tomography using velocity tomography. The terms near vertical boundary and fault are used interchangeably in the following description.

Figure 1:
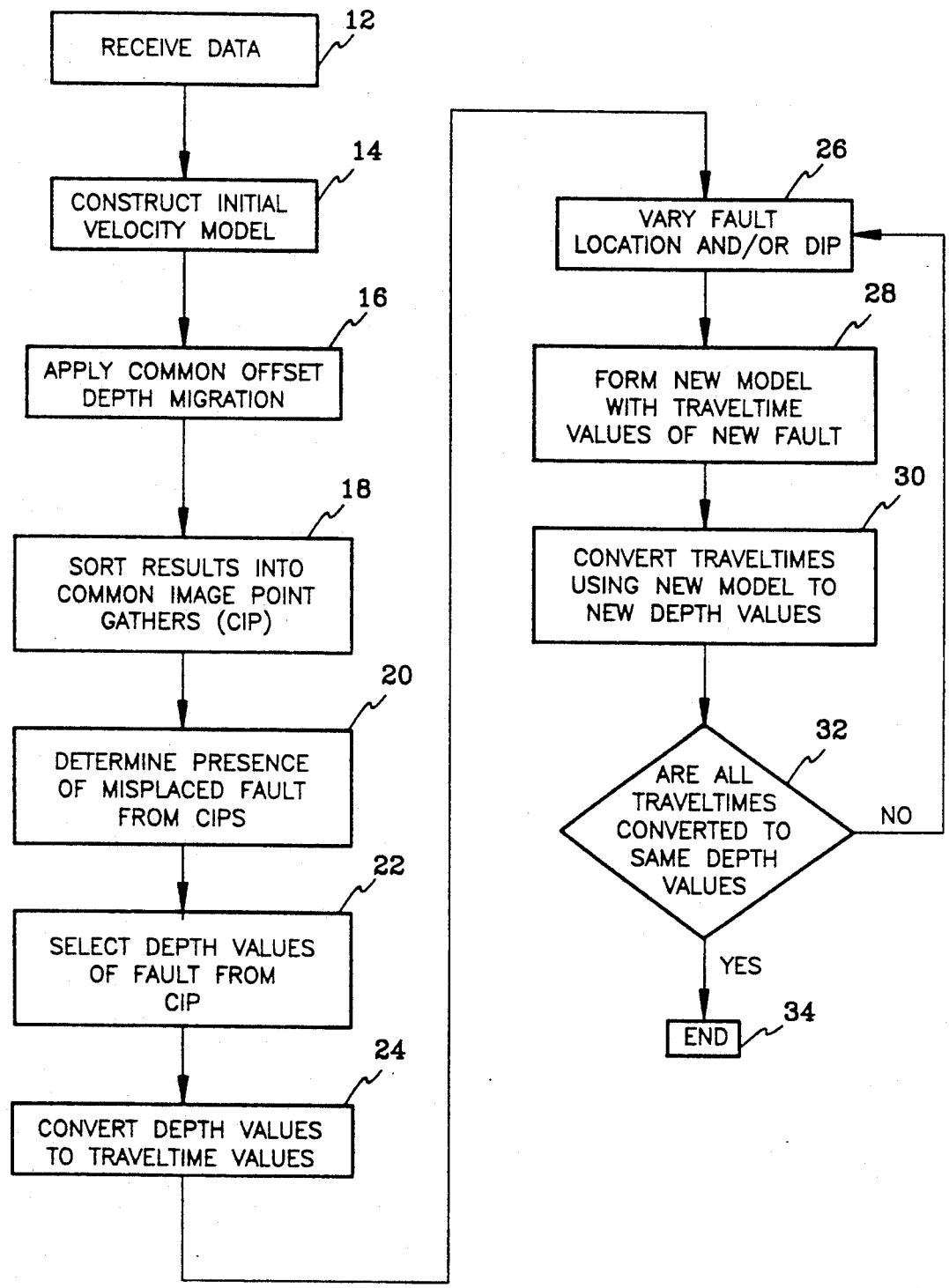
FIG. 1 is a flow chart illustrating the method of the present invention.
Figure 2:
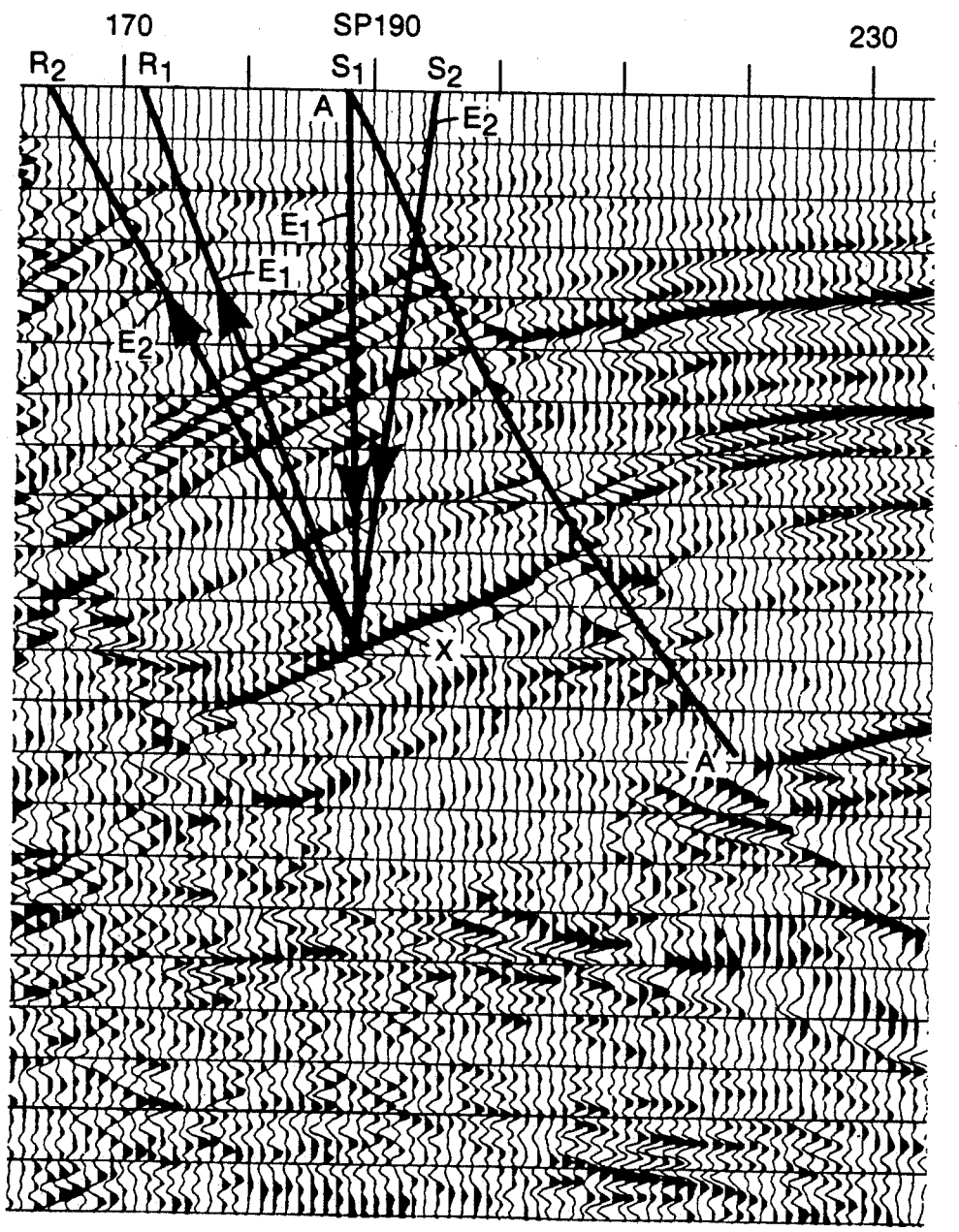
FIG. 2 illustrates a depth section with fault A-A'.

The method of structural tomography of the present invention is illustrated in the flow chart in FIG. 1 in block form. In block 12 data is received. In block 14 an initial velocity model is constructed from the data. Common offset depth migration is applied to the initial velocity model in block 16 resulting in a depth section such as that illustrated in FIG. 2. The results of the common offset depth migration are sorted into common image point (CIP) gathers in block 18. The presence of a misplaced near vertical boundary or fault is determined from the CIP gathers by observing broken-image events on the CIP gather.

Figure 3:
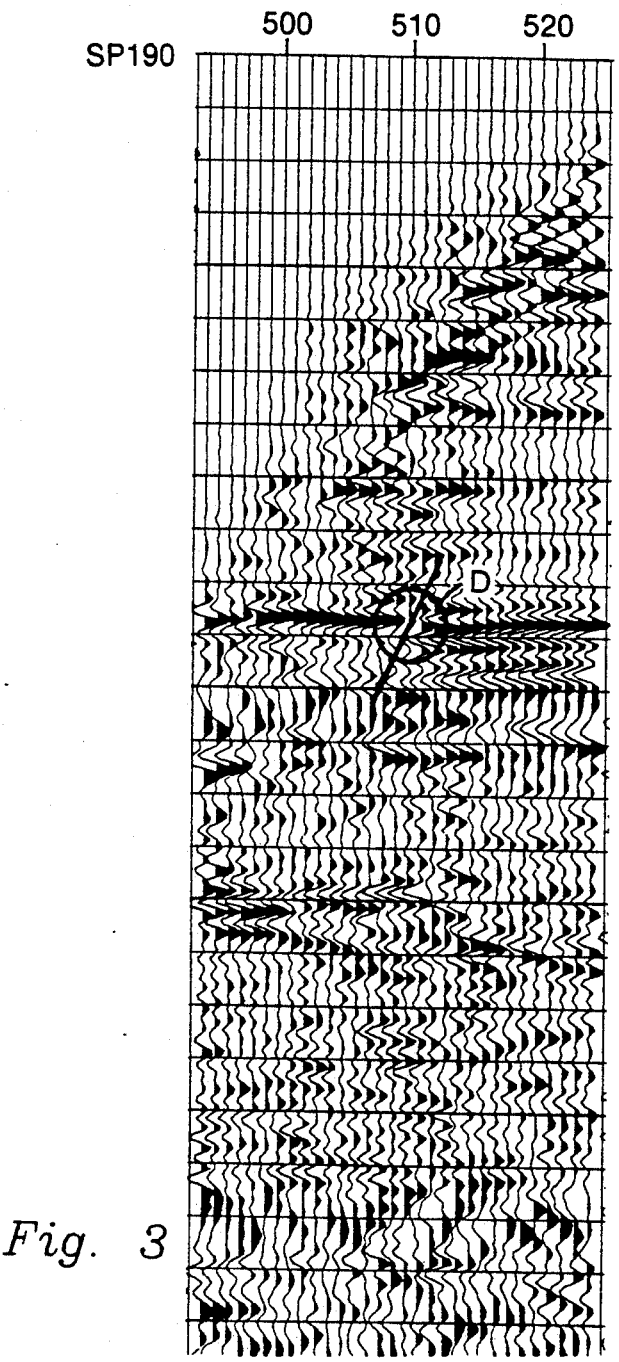
FIG. 3 is a common image point (CIP) gather from the depth section is illustrated in FIG. 2 at SP 190.

A CIP gather for SP 190 is illustrated in FIG. 3. An event D is shown at depth 1075 meters which is flat indicating the correct velocity, however, the event is broken in two pieces at offset 16 or a source to receiver distance of 950 meters. On the depth section with fault A—A' in FIG. 2, the location of SP 190 and reflector X are indicated. Two rays, E1 and E2, which are members of two different ray groups, are also shown on the depth section in FIG. 2. For the E1 ray group, both the source S1 and the receiver R1 are on the same side of the fault. For the E2 ray group, the source S2 and receiver R2 of each ray straddle the fault A—A'. Therefore, an error in placing the fault A—A' will change the traveltimes of the E2 ray group relative to the E1 ray group. An error in placing this fault, therefore, is the reason for the broken event D on CIP 190 as shown in FIG. 3.

At block 22, the depth values of the fault are selected from the CIP gathers. A number of CIP gathers would be used, for example from SP 180 to SP 200 of the depth section in FIG. 2. From each of these CIP gathers, the depth of the broken event is picked for each offset. Or equivalently, common offset depth migration is performed and the depths of the corresponding event is picked from the migrated common offset sections. These depth values are converted to traveltime values in block 24.

At block 26, the fault location and/or dip is varied. The fault A—A' may be varied by moving A or by moving A', which changes the dip and location of the fault, or by shifting fault A—A' to the right or left and keeping the same dip, or by changing the fault dip and keeping the same location. Varying the fault location and/or dip forms a new model with the traveltime values of the new fault location in block 28.

At block 30, for each new choice of the fault, the depths corresponding to the computed traveltimes are recalculated. At block 32, the best choice for the fault location is the one that will convert all the traveltimes to the same depth, or failing that, the location that gives the best least square depth value. The method, therefore, determines the correct fault location by minimizing mismatches of the depth values of the new model.

The present invention has been described by way of a preferred embodiment for illustration purposes only. It is understood that one skilled in the art may make modifications to the present invention without departing from the scope of the following claims.

What is claimed is:

1. A method of structural traveltime tomography for determining near vertical boundary locations from seismic data comprising the steps of;
    receiving seismic data;
    constructing an initial velocity model;
    migrating common offset gathers in depth on said initial model;
    sorting the results of common offset depth migration into common image point (CIP) gathers;
    ascertaining presence of a misplaced near vertical boundary from CIP gathers from said initial model by determining the presence of broken-image events on said CIP gathers;
    selecting the depth values of said misplaced near vertical boundary from CIP gathers;
    converting said depth values to traveltime values;
    varying the near vertical boundary location on said initial model to form a new model with the traveltime values of the changed near vertical boundary location;
    converting the traveltime values of said new model to new depth values; and
    determining the correct near vertical boundary location by minimizing mismatches in said depth values of said new model.

2. The method according to claim 1 wherein varying the near vertical boundary location includes;
    changing the dip of the near vertical boundary or changing the location of the near vertical boundary to the right or left or both.

3. The method according to claim 1 wherein determining the correct near vertical boundary location includes;
    varying the near vertical boundary location until all the traveltime values of the new model are converted to the same depth values wherein mismatches are eliminated.

4. The method according to claim 1 wherein determining the correct near vertical boundary location includes;
    changing the near vertical boundary location until all the traveltime values of the new model are converted to the depth values which give the best least square depth value.

5. A method of structural traveltime tomography for determining near vertical boundary locations from seismic data comprising the steps of;
    receiving seismic data;
    constructing an initial velocity model;
    migrating common offset gathers in depth on said initial model;
    sorting the results of common offset depth migration into common image point (CIP) gathers;
    ascertaining presence of a misplaced near vertical boundary from CIP gathers from said initial model by determining the presence of broken-image events on said CIP gathers;
    selecting the depth values of said misplaced near vertical boundary from corresponding migrated common offset sections;
    converting said depth values to traveltime values;
    varying the near vertical boundary location on said initial model to form a new model with the traveltime values of the changed near vertical boundary location;
    converting the traveltime values of said new model to new depth values; and
    determining the correct near vertical boundary location by minimizing mismatches in said depth values of said new model.

6. The method according to claim 5 wherein varying the near vertical boundary location includes;
    changing the dip of the near vertical boundary or changing the location of the near vertical boundary to the right or left or both.

7. The method according to claim 5 wherein determining the correct near vertical boundary location includes;
    varying the near vertical boundary location until all the traveltime values of the new model are converted to the same depth values wherein mismatches are eliminated.

8. The method according to claim 5 wherein determining the correct near vertical boundary location includes;
    changing the near vertical boundary location until all the traveltime values of the new model are converted to the depth values which give the best least square depth value.

9. An apparatus for structural traveltime tomography for determining near vertical boundary locations from seismic data comprising;
    means for receiving seismic data;
    means for constructing an initial velocity model;
    means for migrating common offset gathers in depth on said initial model;
    means for sorting the results of common offset depth migration into common image point (CIP) gathers;
    means for ascertaining presence of a misplaced near vertical boundary from CIP gathers from said initial model by determining the presence of broken-image events on said CIP gathers;
    means for selecting the depth values of said misplaced near vertical boundary from CIP gathers;
    first means for converting said depth values to traveltime values;
    means for varying the near vertical boundary location on said initial model to form a new model with the traveltime values of the changed near vertical boundary location;
    second means for converting the traveltime values of said new model to new depth values; and
    means for determining the correct near vertical boundary location by minimizing mismatches in said depth values of said new model.

* * * * *